(12) United States Patent
Rue et al.

(10) Patent No.: US 12,343,677 B2
(45) Date of Patent: Jul. 1, 2025

(54) WATER RECOVERY FROM HEATED GAS MIXTURES

(71) Applicant: UTILIZATION TECHNOLOGY DEVELOPMENT, NFP, Des Plaines, IL (US)

(72) Inventors: David M. Rue, Chicago, IL (US); John C. Wagner, LaGrange, IL (US); Sandeep Alavandi, Schaumburg, IL (US)

(73) Assignee: UTILIZATION TECHNOLOGY DEVELOPMENT, NFP, Des Plaines, IL (US)

( * ) Notice: Subject to any disclaimer, the term of this patent is extended or adjusted under 35 U.S.C. 154(b) by 306 days.

(21) Appl. No.: 17/890,649

(22) Filed: Aug. 18, 2022

(65) Prior Publication Data
US 2023/0055251 A1  Feb. 23, 2023

Related U.S. Application Data

(60) Provisional application No. 63/294,234, filed on Dec. 28, 2021, provisional application No. 63/235,300, filed on Aug. 20, 2021.

(51) Int. Cl.
*F28B 1/02* (2006.01)
*B01D 53/26* (2006.01)
*F28B 7/00* (2006.01)

(52) U.S. Cl.
CPC ............. *B01D 53/265* (2013.01); *F28B 1/02* (2013.01); *F28B 7/00* (2013.01)

(58) Field of Classification Search
CPC ............. B01D 53/265; F28B 1/02; F28B 7/00
See application file for complete search history.

(56) References Cited

U.S. PATENT DOCUMENTS

| 5,321,946 | A | * | 6/1994 | Abdelmalek | C10J 3/54 60/648 |
| 9,702,634 | B1 | * | 7/2017 | Mankaruse | F25B 30/02 |
| 2019/0257546 | A1 | * | 8/2019 | Bogart | F24F 13/222 |

FOREIGN PATENT DOCUMENTS

CN  206989781 U  *  2/2018

OTHER PUBLICATIONS

Yu et al., Optimize Heat Pipe Exchanger of Finned Tube, Sep. 2, 2018, CN206989781U, Whole Document (Year: 2018).*

* cited by examiner

*Primary Examiner* — Larry L Furdge
(74) *Attorney, Agent, or Firm* — Pauley Erickson & Swanson (57) ABSTRACT

A method and apparatus for recovering water from a heated gas mixture. The heated gas mixture is passed across one or more heat pipe heat exchangers connected in series. Each heat pipe heat exchanger includes an upper chamber separated from a lower chamber, and sealed heat pipes extending between the chambers. The heated gas mixture is passed across the lower chamber, where the heated gas mixture is cooled with the plurality of heat pipes, passing heat into the heat pipe fluid and thereby condensing water vapor to liquid water on an outside of the of heat pipes. Ambient air or other gas of a cooling temperature is passed across the upper chamber to reduce the heated temperature controlled fluid inside the plurality of heat pipes.

11 Claims, 4 Drawing Sheets

WATER RECOVERY FROM HEATED GAS MIXTURES

CROSS REFERENCE TO RELATED APPLICATION

This application claims the benefits of U.S. provisional patent application, Ser. No. 63/294,234, filed on 28 Dec. 2021, and U.S. provisional patent application, Ser. No. 63/235,300, filed on 20 Aug. 2021. The provisional applications are hereby incorporated by reference herein in their entirety and are made a part hereof, including but not limited to those portions which specifically appear hereinafter.

BACKGROUND OF THE INVENTION

Field of the Invention

This invention relates generally to recovering liquid water vapor and, more particularly, to a process to recover liquid water as a component from a heated gas containing water vapor.

Description of Prior Art

There are a number of technologies for cooling process gases. Such technologies include multiple variations on direct and indirect heat exchangers, variations on vapor compression cycles, thermal ejectors, and reverse heat pumps.

Heat pipes and thermal syphons have been used for a number of applications in industrial settings, but not for the removal of water from process fluids. Removal of water from process fluids presents several challenges. One challenge is there is a high heat load. High latent heat of water requires a high amount of heat rejection from a process gas. Another challenge is rejection of heat to the environment. Since ambient air temperatures vary through a daily, and annual cycle, designing a heat pipe or thermal syphon approach to heat rejection and water recovery from a process gas stream presents specific requirements on a process.

Gas to gas heat exchangers are employed in multiple applications, but these heat exchangers do not scale well to large industrial applications. Heat transfer coefficients would be low and would have high power requirements for fans because high ambient air flow results in low heat transfer and differential pressure coefficients. Also, gas to gas heat exchangers can only effectively recover a small fraction of water in an exhaust gas. The high latent heat of water makes recovery of more than 10 to 20% of the water impractical. Vapor compression cycles have also been used and are well suited to small applications. However, power requirements for compressors preclude use of this technology for large-scale industrial applications.

SUMMARY OF THE INVENTION

The invention generally relates to a method for recovering water from process gases so that water recovery is a practical approach to supplement or replace fresh water supplies. Water is becoming an increasingly valuable resource. There is a cost associated with fresh (potable) water, and there is also a cost associated with the disposal of waste water. While fresh water has value, the cost of recovering water from process gases and flue gases is almost always significantly higher than the cost of buying fresh water.

The invention includes a method of recovering water from a heated gas mixture. The method includes steps of: passing a heated process gas across a first section of a sealed heat exchanger, the sealed heat exchanger including an outer surface and an interior chamber filled with a fluid; collecting condensed water from the outer surface of the sealed heat exchanger; and transferring heat from a second section of the sealed heat exchanger to a heat sink.

In embodiments, the heat sink includes passing a cooling gas across the second section of the sealed heat exchanger, wherein heat from the heated process gas is transferred to the cooling gas via the sealed heat exchanger. The heated process gas and the outer surface of the first section of a sealed heat exchanger are separated from the heat sink and the outer surface of the second section of a sealed heat exchanger by a chamber divider.

The sealed heat exchanger desirably includes one or more individually sealed heat pipes, each having a corresponding outer surface and interior chamber filled with the fluid. In some embodiments, a first group of the plurality of individually sealed heat pipes includes a first fluid, and a second group of the plurality of individually sealed heat pipes includes a second fluid that is different than the first fluid. In preferred embodiments, the plurality of individually sealed heat pipes are vertically positioned.

The invention desirably includes two or more serial heat exchangers. The invention can include steps of: passing the cooled process gas across a first section of the second sealed heat exchanger, the second sealed heat exchanger including a second outer surface and a second interior chamber filled with a second fluid; collecting additional condensed water from the second outer surface of the second sealed heat exchanger; and passing a second cooling gas across a second section of the second sealed heat exchanger, wherein additional heat from the cooled process gas is transferred to the cooling gas via the second sealed heat exchanger. The fluids in two heat exchangers can be the same or different.

In embodiments of this invention, the cooled process gas is passed to carbon dioxide recovery or conversion process. The collected condensate water can also be passed to any suitable use. The heated air or cooling gas, after passing through one or more heat exchangers, can be collected and transported to a combustion system to serve as preheated air as a way to reduce fuel consumption in the combustion process, The invention further includes a method of recovering water from a heated gas mixture, including the steps of: introducing a heated gas mixture into one or more heat pipe heat exchangers connected in series, wherein the one or more heat pipe heat exchangers each include an upper chamber separated from a lower chamber; passing the heated gas mixture across the lower chamber, wherein the lower chamber comprises a plurality of heat pipes filled with a temperature-controlled fluid; cooling the heated gas mixture with the plurality of heat pipes; condensing water vapor to liquid water, wherein the liquid water deposits on an outside of the plurality of heat pipes; collecting the liquid water in a portion of the heat pipe heat exchanger; and passing ambient air or other cooler gas across the upper chamber to condense the temperature controlled fluid inside the plurality of heat pipes. The plurality of heat pipes desirably include individually sealed heat pipes extending between the upper and lower chamber and filled with same or different temperature-controlled fluids (e.g., different in type and/or pressure). The condensed temperature controlled fluid returns into contact with the lower chamber.

The invention further includes as apparatus for recovering water from a heated gas mixture. The apparatus including a heat exchanger with a first chamber and a second chamber, and a plurality of individually sealed heat pipes. Each of the heat pipes includes a first section within the first chamber, a second section within the second chamber, and an interior chamber extending along and within the first and second sections and including a fluid. The first chamber is configured to receive and pass a heated process gas across the first section of the heat pipes. The second chamber includes a heat sink in combination with the second section of the heat pipes. The heat sink can be a cooling gas flow (e.g., ambient air) through the second chamber, and the heated process gas and the cooling gas can flow through the heat exchanger in a co-current, counter-current or a cross-current manner to each other.

In embodiments, fluid inside the heat pipes is heated and rises inside the heat pipes into the second chamber where the fluid is cooled. Fluid inside the heat pipes rises from the first to the second chamber and returns without external energy input because heated fluids are less dense with heated fluids rising and cooler fluids dropping in elevation. In a preferred embodiment of this invention, the fluid in the heat pipes in the lower chamber is caused to boil, vapor rises into the upper parts of the heat pipes in the second chamber, the vapor is cooled in the second chamber to form liquid, and the liquid drops inside the heat pipes back to the first chamber. This action, taking advantage of the large quantity of heat at a constant temperature provided by the latent heat of the fluid in the heat pipes provides high heat transfer rates with reduced surface area and reduced number of heat pipes at precisely known temperatures. The heat pipes can be tuned to foiling internal fluid at precise temperatures to maximize heat transfer by controlling the selected fluid and selected pressure inside each heat pipe.

This invention overcomes the high electricity cost that is needed for a vapor-compression cycle. Vapor compression refrigeration equipment is readily available, compact, and fairly inexpensive. However, the operating cost is very high relative to the amount and value of water that can be collected.

To condense water from process gases and flue gases a very high volumetric flow rate of ambient air is required. This customarily increases equipment size and cost while also increasing the fan power needed for a large air volumetric flow rate. In the subject invention, temperature gradients are highly non-uniform. This leads to differential temperature pinch points that cannot be overcome in traditional heat exchangers. As differential temperatures become smaller, equipment size increases. In response, the claimed invention provides heat pipes that remain at a nearly constant temperature, thereby avoiding the occurrence of differential temperature pinch points.

The heat pipes have temperatures in both upper and lower chambers that must be maximized. The heat pipes are aligned in multiple rows inside a heat exchanger which provide the opportunity to maximize differential temperatures. The claimed invention uses multiple heat pipe heat exchanger (HPHX) units which greatly increase flexibility to maximize temperature differences and minimize equipment size, all while handling inherent variations in ambient air temperature.

The claimed invention preferably uses two or more serial HPHX units. When heated gas temperature and composition remain constant, a single HPHX unit will be efficient for only a narrow range of ambient air temperatures and will be particularly inefficient at a high end of acceptable ambient air temperatures. Utilizing multiple HPHX units allows the overall process of the claimed invention to be efficient over a much wider ambient air temperature range and to be efficient at higher ambient air temperatures. The increased complexity in controls to control multiple HPHX units is warranted because efficiency is improved, operation is efficient over a wider ambient air temperature range, and more stable control can be established and maintained.

In embodiments of this invention, a fan or blower system is included to deliver the ambient air or other cooling gas to the heat exchangers. The system includes a control system that controls the fan power to optimize the system, such as minimizing overall power requirements. The fan for each heat exchanger can be an independently variable speed fan to operate differently to maximize efficiency. For example, the fan power and speed can be varied depending on ambient air temperatures. A fan for the first heat exchanger can be variable (e.g., varied depending on the air/cooling gas temperature), and the fan for the second heat exchanger can be fixed or also independently variable. In some operations, either or both fans can be turned off when not needed, such as depending on ambient air temperature.

Other objects and advantages will be apparent to those skilled in the art from the following detailed description taken in conjunction with the appended claims and drawings.

DETAILED DESCRIPTION OF THE INVENTION

The present invention provides a process and system to recover liquid water that is in vapor form as a component of a heated gas mixture, such as a process exhaust gas. In particular, this process recovers liquid water from gas mixtures with temperatures below 650° F. Recovery of water from these gas mixtures is achieved by cooling the gas mixture and condensing the water vapor. The subject invention provides a method and apparatus to recover water from humid gas mixtures, preferably gas mixtures with high water content. When cooling these gas mixtures to recover liquid water, part of a cooling duty is needed to lower the temperature of the gas components, but the majority of the cooling duty is used as energy needed to overcome a high latent heat of evaporation of water. The high latent heat must be overcome to convert water from vapor to liquid water.

In the subject invention, a gas mixture is cooled to condense water with heat rejected to a sink. The sink can be, for example, the ground or ambient air. In presently preferred embodiments of the invention, the heat is rejected to ambient air.

The process to recover water from heated gas mixtures is preferably compact, modular, economical, and requires a low amount of input power. A system of the invention can be integrated with renewable resources such as solar and/or wind to make the system carbon neutral.

In embodiments of this invention, liquid water is recovered from a gas mixture by cooling the gas mixture and condensing the water vapor therein to liquid. The higher the temperature difference between the heated gas mixture and the ambient air coolant, the lower the heat transfer surface area required. The laws of thermodynamics show that in transferring heat across a heat transfer surface, the heat flux is higher when one side contains a liquid and higher still when both sides contain a liquid. Physics teaches that liquids such as water boil at a constant temperature at a specific pressure. Boiling point is a well-known value based on the properties of a fluid and the pressure above the fluid. The latent heat of boiling (or evaporation) of a fluid is much greater than the sensible heat of the same fluid even over a wide temperature range.

Embodiments of the subject invention use sealed heat exchangers, such as heat pipes in collective heat pipe heat exchangers. The heat pipe heat exchange provides several advantages. The heat pipes in the heat pipe heat exchanger (HPHX) units are preferably sealed tubes of any suitable shape that contain a fluid that boils at a precisely engineered condition. An HPHX unit of embodiments of this invention is divided into an upper chamber and a lower chamber. The heat pipes are arranged vertically, extending through the divider, with a portion of the heat pipes in the upper chamber and the remaining portion of the heat pipes in the lower chamber.

The heated gas mixture containing water vapor is introduced to the lower chamber. The heat gas mixture is passed across the lower portion of the heat pipes and exits the lower chamber on another side opposite an entrance. Fluid inside the heat pipes is engineered to have a boiling point temperature such that the heated gas mixture is cooled upon contact with the heat pipes. Water vapor in the heated gas mixture condenses into liquid water as the heated gas mixture passes through the lower chamber as the temperature of the heated gas mixture drops. The water then runs down the outside of the heat pipes, collects in the bottom of the lower chamber, and is drained from the bottom of the lower chamber. The fluid inside the lower portion of the heat pipes boils and flows upward, carrying heat up into the upper portion of the heat pipes in the upper chamber.

Air or other cooling gas is introduced to the upper chamber. The air is passed across the upper portion of the heat pipes and exits the upper chamber on the side opposite the entrance. The temperature of the air rises as the air passes through the upper chamber. When heat is extracted from the fluid inside the heat pipes, the fluid inside the heat pipes cools and condenses into a liquid that drops down into the lower portion of the heat pipes in the lower chamber. This action of the fluid inside the heat pipes serves to move heat from the heated gas mixture to the air with no need to provide energy to move the fluid inside the heat pipes.

Heat pipes according to the subject invention maximize temperature differential in both the upper and lower chambers. This allows a surface area of the heat pipes to be minimized. Separation of the heated gas mixture and the air allows for water recovery without interfering with air flowing through the upper chamber. A flow rate of the heated gas mixture can be independently controlled from the air flow rate so the amount of heat transfer and water collection in the heat pipe heat exchanger can also be controlled.

Figure 1:
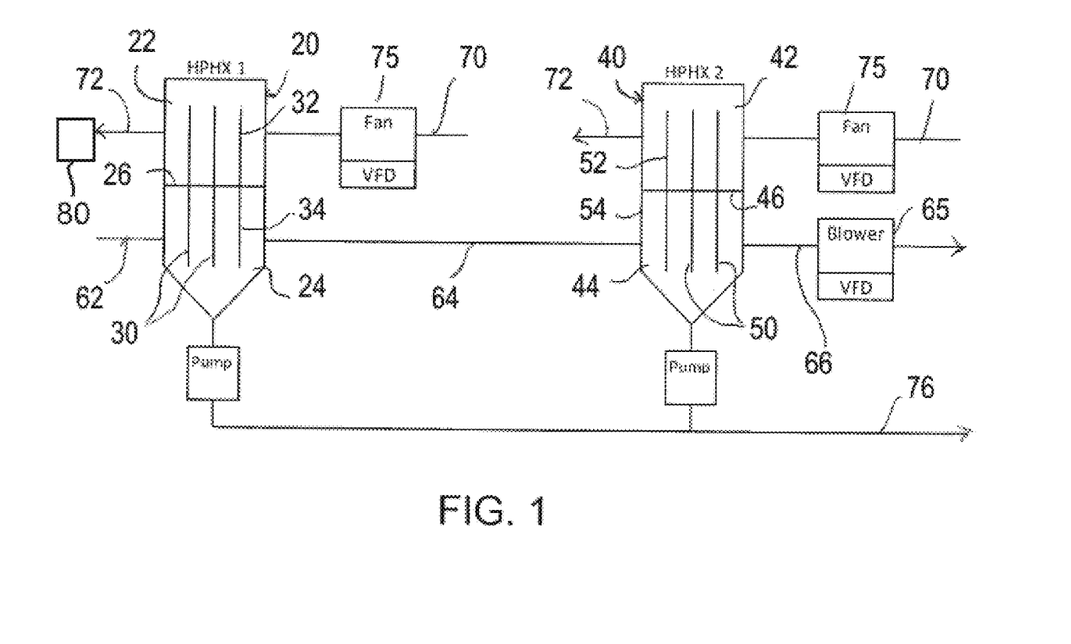
FIG. 1 shows a schematic of a system and a flow of a heated gas mixture according to one embodiment of the invention.

FIG. 1 schematically shows an apparatus and flow streams according to one embodiment of this invention. The illustrated system includes a first HPHX unit 20 and a similar second HPHX unit 40. The first HPHX unit 20 includes a first, upper chamber 22 and a second, lower chamber 24, separated by dividing wall 26. The first HPHX 20 includes a plurality of heat pipes 30, each individually sealed and including an evaporable fluid. A first section 32 of each heat pipe 30 is in the upper chamber 22 and a second section 34 of the each heat pipe is in the lower chamber 24. The second HPHX unit 40 also includes a first, upper chamber 42 and a second, lower chamber 44, separated by dividing wall 46. The second HPHX 40 includes a second plurality of heat pipes 50, each individually sealed and including an evaporable fluid that may be the same or different from heat pipes 30. A first section 52 of each heat pipe 50 is in the upper chamber 42 and a second section 54 of the each heat pipe 50 is in the lower chamber 44. Additional serial HPHX units can also be included, depending on need.

A heated gas mixture 62 (e.g., a process exhaust gas mixture or other gas mixture) is introduced into the bottom chamber 24 of the first heat pipe heat exchanger 20. A flow of the heated gas mixture is driven by a blower 65 or other suitable piece of equipment, as needed. In some embodiments no equipment is necessary if a stream of heated gas is under sufficient pressure. The blower 64 may be downstream from a last heat pipe heat exchanger unit as shown, somewhere in between heat exchanger units, or upstream of the first heat pipe heat exchanger. Some embodiments include the use of multiple blowers. The blower(s) may or may not be operated by variable frequency drive(s) (VFDs), and controlled as discussed herein for power efficiency, such as in view of ambient air temperatures. The heated gas mixture stream 62 is cooled in the first heat pipe heat exchanger unit 20. The resulting cooled stream 64 is then introduced into the bottom half 54 of the second heat pipe heat exchanger unit 40, resulting in a further reduction of temperature in cooled stream 66.

The overall process shown in FIG. 1 includes two or more heat pipe heat exchanger units 20, 40, with lower chambers 24, 44 of each unit operated in series, and with hot process gas 62 cooled stepwise through the units 20, 40. Fan(s) 75 can be used to blow ambient air 70 or other cooling gas through upper chambers 22, 42 of each heat pipe heat exchanger unit 20, 40 in a parallel arrangement. The fan(s) 75 may or may not be operated by VFD(s). In one embodiment of the invention, as illustrated, a separate fan 75 may be used for each heat pipe heat exchanger unit 20, 40, etc. A multiplicity of heat pipe heat exchanger units may be fed with ambient air by a single fan as long as the upper chambers of the heat pipe heat exchanger units are fed in parallel.

Ambient air 70 is heated in each heat pipe heat exchanger unit 20, 40 and then vented to the atmosphere. The heated air 72 is not sent to any subsequent heat pipe heat exchanger unit. The heated air 72 may, in one embodiment, be sent to a combustion system 80 to be used as preheated air as a way to improve the efficiency of the combustion system. Water is condensed from the hot process gas 62, 64 located in the bottom half 24, 44 of each heat pipe heat exchanger unit 20, 40. Condensed water 76 is pumped from the bottom of each heat pipe heat exchanger unit 20, 40 into a storage vessel, retention pond, or used directly in a commercial or industrial process.

Hot process gas flow and ambient air flow can be co-current, counter-current, or cross-current in each heat pipe heat exchanger unit. The upper and lower chambers of the heat pipe heat exchanger units may include a single pass or a multiplicity of passes. In one embodiment, each heat pipe heat exchanger unit may have a plurality of rows of heat pipes arranged perpendicular to a heated gas mixture stream. In another embodiment, each heat pipe heat exchanger unit and may have a plurality of columns of heat pipes arranged parallel to the heated gas mixture stream. Each of the multiple rows of heat pipe tubes in each heat pipe heat exchanger can be tuned with a specific fluid at a selected elevated or reduced pressure to have a desired boiling point temperature. Any suitable heat sink can be used for the heat transfer chamber, such as a cooling fluid or other material.

The process and its operation according to embodiments of the subject invention offer flexibility while maintaining maximum efficiency over a wide range of ambient air temperatures. This is critical because heat is rejected to the atmosphere while ambient air temperature changes with time. The invention provides a way to transfer heat from a heated gas mixture to ambient air which is then discharged to the environment. Each vertical heat pipe in a heat pipe heat exchanger unit contains a fluid at a selected pressure that boils at a pre-determined temperature. As the heated gas mixture contacts the outside of heat pipes in the lower chamber of each heat pipe heat exchanger, the fluid inside the heat pipes boils and rapidly carries heat to the upper chamber of the heat pipe heat exchanger unit. Ambient air passes across outsides of heat pipes in the upper chamber of the heat pipe heat exchanger unit. The ambient air cools the vaporized fluid inside the heat pipes. This condenses the fluid in the heat pipes where the fluid falls under gravity back to the bottom portion of the relevant heat pipe heat exchanger unit to repeat the cycle.

The transfer of heat according to the invention is desirably extremely rapid, with heat carried from lower portions of the heat pipe heat exchanger units to upper portions, and then rejecting heat to the environment. The upper and lower portions of the heat pipe heat exchanger units can vary in volume. The fluid carrying the heat is sealed inside the heat pipes where it does not come into contact with either the heated process gas or the ambient air. A vertical orientation of the heat pipes provides a way to move internal fluid up and down the heat pipes driven only by thermal energy. In other embodiments of the invention the heat pipes can be oriented at different angles. No internal pumping is needed.

The heat pipes provide extremely high thermal flux because the internal fluid is constantly boiled and condensed. This maintains the heat pipes at a near-constant temperature, a key design feature that maximizes the differential temperature between the heated process gas and the heat pipes in the lower part of the heat pipe heat exchanger units and between the ambient air and the heat pipes in the upper part of the heat pipe heat exchanger units.

The amount of energy needed to operate the air fans is inversely proportional to the differential temperature in both parts of the heat pipe heat exchanger units. The differential temperatures are further increased by using multiple rows of heat pipes inside each heat pipe heat exchanger unit with fluids boiling at different temperatures. In some embodiments of the invention, the differential temperature can also be increased by making the heat pipe heat exchanger units wider. Design is used to determine the optimum heat transfer rates by determining the number of rows of heat pipes and the width of the heat pipe heat exchanger units.

The heated process gas and the ambient air can flow in co-current, counter-current, or cross-current configurations. The heated process gas and ambient air preferably do not come in to contact with each other inside the heat pipe heat exchanger units. Several other improvements can also improve heat transfer to the heat pipes. For example, the outside of the heat pipes can be finned. The heat pipes can be made of highly thermally conductive materials. This is possible because process gas temperatures are not expected to exceed 650° F., and rarely exceed 500° F. However, higher temperatures are also possible. Rows of fins can be spaced to optimize heat transfer while minimizing pressure drop.

Figure 2:
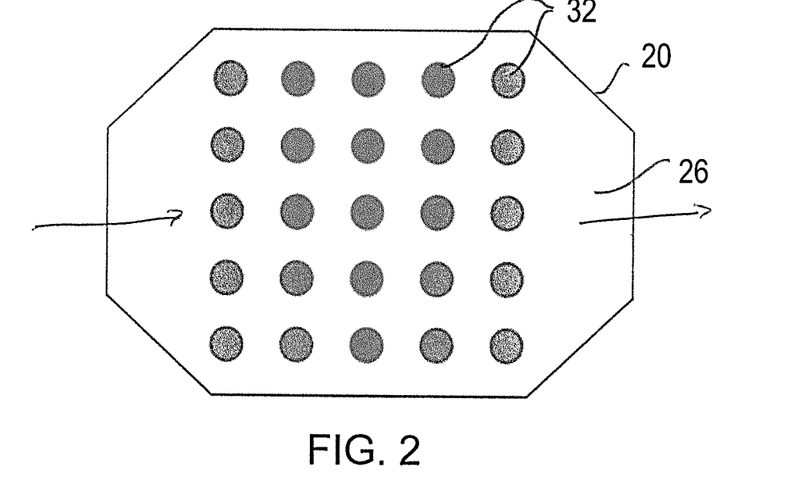
FIGS. 2 and 3 show heat pipe configurations according to embodiments of the invention.
Figure 3:
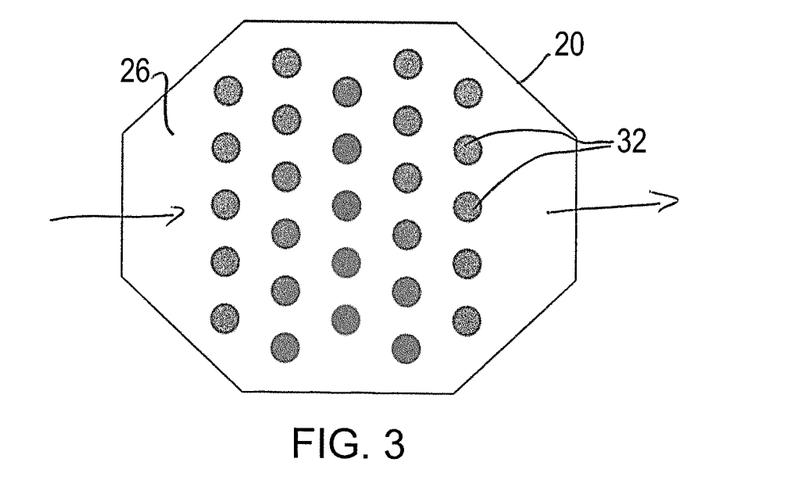

FIGS. 2 and 3 show alternative exemplary heat pipe configurations (where the heat pipes are shown from above or below). Five columns of tubes 32 are shown in the configurations of FIGS. 2 and 3, but the number of rows and the number of tubes in each row and how the tubes are staggered between rows can be varied depending on the needs of the specific application. Arrows indicate the direction of gas flow through the unit 20.

Figure 4:
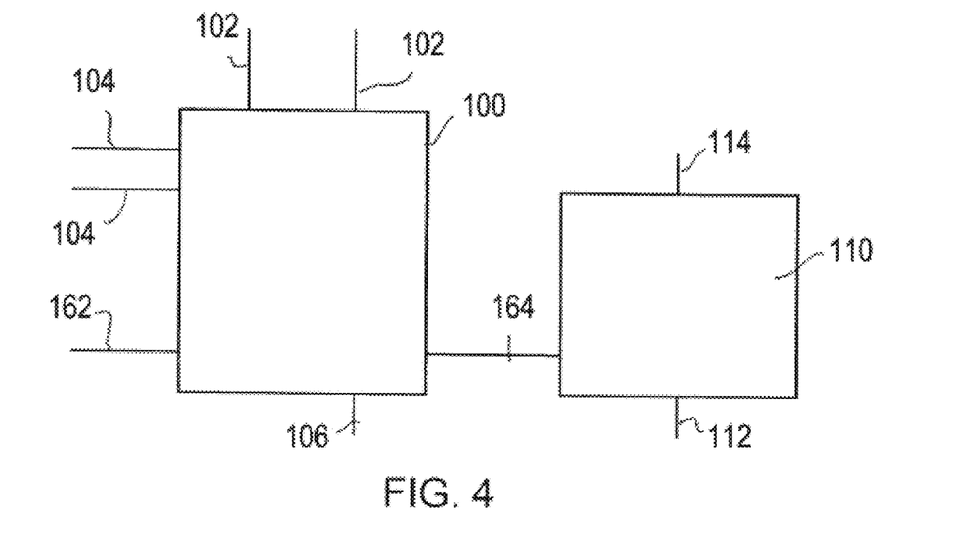
FIG. 4 shows an embodiment of the invention in which the process gas exiting the HPHX units is sent to a process step to capture carbon dioxide or to convert the carbon dioxide the other chemical compounds.
Figure 5:
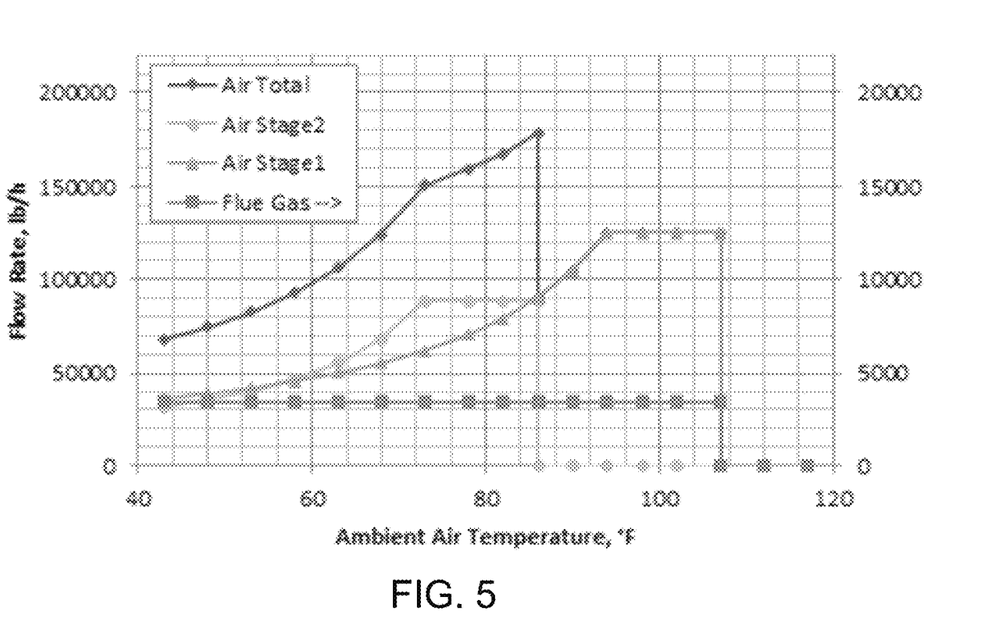
FIG. 5 shows a graphical representation of heat exchanger performances according to one embodiment of the invention.
Figure 6:
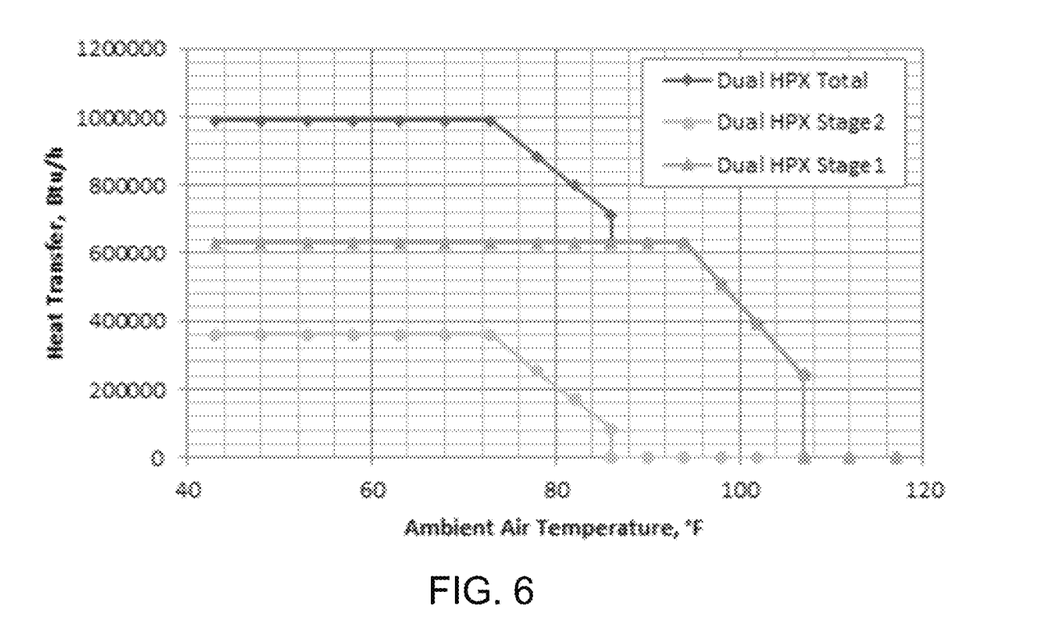
FIG. 6 shows a graphical representation of heat exchanger performances according to one embodiment of the invention.
Figure 7:
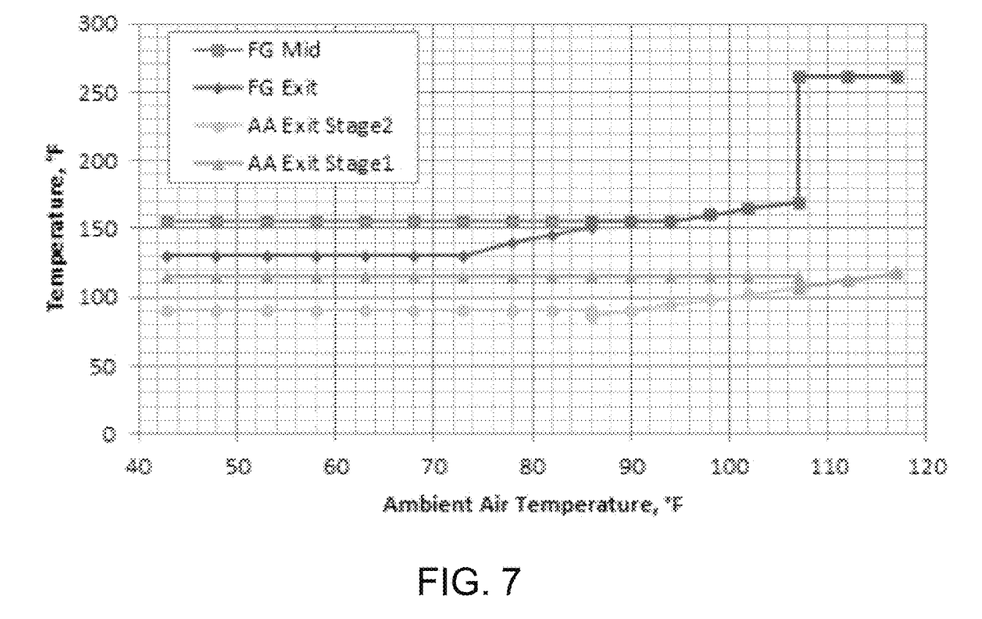
FIG. 7 shows a graphical representation of heat exchanger performances according to one embodiment of the invention.
Figure 8:
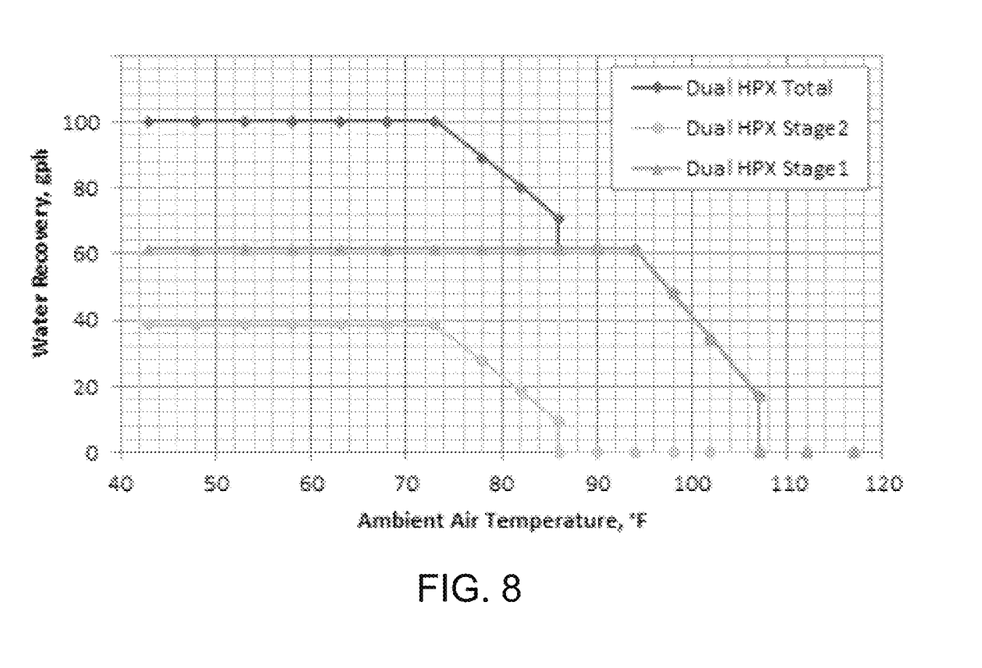
FIG. 8 shows a graphical representation of heat exchanger performances according to one embodiment of the invention.

FIG. 4 illustrates another embodiment of this invention. In this embodiment water is recovered from the hot exhaust gas 162 using a water recovery system 100 having two HPHX units. Illustrated are two ambient air inlets 102, two heated air outlets 104, and a water outlet 106 for the collective unit 100. After leaving the final heat pipe heat exchanger unit, the cooled process gas 164 is sent to a process unit 110 designed to either capture carbon dioxide or to convert carbon dioxide to other chemical compounds. Recovery of carbon dioxide or conversion of carbon dioxide to other chemicals requires the input of energy through fans, blowers, or similar devices to move a gas mixture through the carbon dioxide processing unit 110. In this invention most or all of that needed energy is supplied by the fans, blowers, or similar devices in place to move the hot process gas through the water recovery heat pipe heat exchangers. This approach provides an economical means to recover water as well as to process carbon dioxide 112 from a final exhaust 114, with lower energy consumption. Water is recovered as a valuable resource with commercial value, and the cost of carbon dioxide management is reduced. The synergistic benefit of this embodiment is to lower the cost of recovering water and managing carbon dioxide. This embodiment also provides a condition in which recovery of water from hot process gas streams with lower water concentrations than is possible with water recovery alone.

A primary feature of embodiments of this invention is the control scheme for adjusting the system to changes in ambient air temperature in order to maximize water recovery with minimum energy consumption for the fans. The highest water recovery with the lowest energy consumption is realized with the lowest ambient air temperature. Conversely, there are ambient air temperatures too high to recover significant amounts of water at practical energy levels because differential temperatures are too close. If differential temperatures (ambient air to heat pipes or heated gas mixture to heat pipes) drop below 10° F., water recovery becomes too low in comparison to the necessary energy input to be practical.

The invention includes protocol methods to operate multiple heat pipe heat exchanger units in the most stable and most efficient manner For example, one embodiment of the invention includes two heat exchangers and an annual ambient temperature range of 43 to 107° F. Smooth operation is achieved by controlling the multiple heat pipe heat exchanger units over multiple regimes that are defined by ambient air temperature. In this embodiment, varying ambient air temperature ranges are shown, and compared, with a less efficient process where only a single heat pipe heat exchanger unit is used. The varying ambient air temperature ranges are illustrated in the following exemplary regimes.

Regime 1 includes ambient air below 73° F. Both heat pipe heat exchanger units are operated with varying amounts of ambient air. Ambient air flow decreases as ambient air temperature drops and thus power to fans on both heat pipe heat exchanger units decreases as ambient air temperature drops. Regime 2 includes ambient air between 73 and 86° F. The first heat pipe heat exchanger unit is operated as in Regime 1 with a varying amount of ambient air while the second heat pipe heat exchanger unit is operated with a fixed amount of ambient air. Regime 3 includes ambient air between 86 and 94° F. The first heat pipe heat exchanger unit is operated with a varying amount of ambient air while the second heat pipe heat exchanger unit is not operated. Water is only recovered from the first heat pipe heat exchanger unit. Regime 4 includes ambient air between 94 and 107° F. The first heat pipe heat exchanger unit is operated with a fixed amount of ambient air while the second heat pipe heat exchanger unit is not operated. Regime 5 includes ambient air above 107° F. Both heat pipe heat exchanger units are off There is no water recovery.

FIGS. 5-8 shows graphical representations of heat exchanger performances according to exemplary embodiments of the invention.

The invention illustratively disclosed herein suitably may be practiced in the absence of any element, part, step, component, or ingredient which is not specifically disclosed herein.

While in the foregoing detailed description this invention has been described in relation to certain preferred embodiments thereof, and many details have been set forth for purposes of illustration, it will be apparent to those skilled in the art that the invention is susceptible to additional embodiments and that certain of the details described herein can be varied considerably without departing from the basic principles of the invention.

What is claimed is:

1. A method of recovering water from a heated gas mixture, the method comprising the steps of:
   providing a first heat pipe heat exchanger unit and a second heat pipe heat exchanger unit, each including a plurality of rows of individually sealed heat pipes, each of the individually sealed heat pipes having an outer surface and interior chamber filled with a fluid, and the outer surface having a first section separated from a second section by a divider wall between chambers of the first or second heat pipe heat exchanger unit;
   passing a heated process gas across first sections of the individually sealed heat pipes in the first heat pipe heat exchanger unit to form a cooled process gas;
   passing a first cooling gas across second sections of the individually sealed heat pipes of the first heat pipe heat exchanger unit, wherein heat from the heated process gas is transferred to the first cooling gas via the first heat pipe heat exchanger unit, and wherein the heated process gas and the first cooling gas are separated by the divider wall in the first heat pipe heat exchanger unit;
   collecting condensed water from each of the first sections of the individually sealed heat pipes in the first heat pipe heat exchanger unit;
   passing the cooled process gas across first sections of the individually sealed heat pipes of the second heat pipe heat exchanger unit to form a cooled stream;
   collecting additional condensed water from each of the first sections of the individually sealed heat pipes in the second heat pipe heat exchanger unit;
   passing a second cooling gas across second sections of the individually sealed heat pipes of the second heat pipe heat exchanger unit, wherein additional heat from the cooled process gas is transferred to the second cooling gas via the second heat pipe heat exchanger unit, and wherein the cooled process gas and the second cooling gas are separated by the divider wall in the second heat pipe heat exchanger unit, wherein each of the first and second cooling gas is ambient air;
   delivering the first and second cooling gases at different and/or varying flow rates as a function of a temperature of the ambient air to optimize differential temperatures and to minimize power requirements per unit volume of recovered water;
   passing the cooled stream to a carbon dioxide recovery or conversion process, wherein the cooled stream includes less water vapor then the heated process gas to promote process efficiency; and
   delivering at least the first cooler gas, after passing through the first heat pipe heat exchanger unit, to a combustion system as preheated air to reduce fuel consumption in a combustion process.

2. The method of claim 1, wherein a first group of the plurality of individually sealed heat pipes includes a first fluid, and a second group of the plurality of individually sealed heat pipes includes a second fluid that is different in type or pressure from the first fluid.

3. The method of claim 1, wherein the plurality of individually sealed heat pipes are vertically positioned.

4. The method of claim 1, wherein the delivering of the first and second cooling gases comprises providing each of the first heat pipe heat exchanger unit and the second heat pipe heat exchanger unit with an independently controlled variable speed fan.

5. The method of claim 1, further comprising:
   delivering the first cooling gas with a first variable speed fan;
   delivering of the second cooling gas with a second variable speed fan; and
   independently adjusting the first and second variable speed fans as a function of a temperature of the ambient air.

6. The method of claim 5, wherein the independently adjusting the first and second variable speed fans comprises turning off one of the first or second variable speed fans.

7. The method of claim 5, wherein a control system independently adjusts the first and second variable speed fans.

8. The method of claim 7, wherein the control system operates in one of a plurality of predetermined operation modes depending on a temperature of the ambient air.

9. The method of claim 5, wherein each of the first and second variable speed fans is in combination with a separate ambient air inlet.

10. The method of claim 5, wherein an ambient air flow decreases through the first and second heat pipe heat exchanger unit as ambient air temperature decreases.

11. The method of claim 1, wherein the plurality of rows of individually sealed heat pipes are staggered within each of the first heat pipe heat exchanger unit and the second heat pipe heat exchanger unit.

* * * * *